United States Patent
Chen et al.

(10) Patent No.: US 6,797,748 B2
(45) Date of Patent: Sep. 28, 2004

(54) POLYURETHANE BASED INKS FOR WRITING INSTRUMENTS

(75) Inventors: Qingping Chen, Simpsonville, SC (US); Michael T. Nowak, Simpsonville, SC (US)

(73) Assignee: Bic Corporation, Milford, CT (US)

( * ) Notice: Subject to any disclaimer, the term of this patent is extended or adjusted under 35 U.S.C. 154(b) by 0 days.

(21) Appl. No.: 09/876,984

(22) Filed: Jun. 8, 2001

(65) Prior Publication Data

US 2003/0055127 A1 Mar. 20, 2003

(51) Int. Cl.[7] .......................... C09D 11/18; C08L 75/04
(52) U.S. Cl. ........................................ 523/161; 524/590
(58) Field of Search ....................... 523/160, 161; 524/589, 590; 106/31.27, 31.28, 31.6

(56) References Cited

U.S. PATENT DOCUMENTS

| | | | |
|---|---|---|---|
| 3,728,298 A | 4/1973 | Hartmann | 260/31.4 R |
| 4,003,751 A | 1/1977 | Carder | 106/20 |
| 4,077,807 A * | 3/1978 | Kramer et al. | 106/31.28 |
| 4,146,699 A * | 3/1979 | Cook | 525/452 |
| 4,389,499 A | 6/1983 | Riesgraf | 523/161 |
| 4,390,646 A | 6/1983 | Ferguson | 523/161 |
| 4,391,927 A | 7/1983 | Farmer, III | 523/161 |
| 4,471,079 A * | 9/1984 | Enami | 523/161 |
| 4,525,216 A | 6/1985 | Nakanishi | 106/30 |
| 4,532,276 A * | 7/1985 | Knable et al. | 524/18 |
| 4,686,246 A * | 8/1987 | Gajria | |
| 4,793,264 A | 12/1988 | Lin et al. | |
| 4,812,492 A | 3/1989 | Eckes et al. | 523/351 |
| 4,957,949 A | 9/1990 | Kamada et al. | 523/201 |
| 5,059,246 A * | 10/1991 | Yamamoto et al. | 106/31.58 |
| 5,248,752 A | 9/1993 | Argyropoulos | 528/49 |
| 5,594,044 A * | 1/1997 | Yang | 523/160 |
| 5,663,217 A * | 9/1997 | Kruse | 523/161 |
| 5,756,561 A | 5/1998 | Wang et al. | 523/161 |
| 5,837,042 A * | 11/1998 | Lent et al. | 106/31.14 |
| 5,852,072 A | 12/1998 | Banning et al. | 523/161 |
| 5,852,073 A | 12/1998 | Villiger et al. | 523/161 |
| 5,868,511 A | 2/1999 | Osada | 401/209 |
| 5,886,091 A * | 3/1999 | Harns et al. | 524/590 |
| 5,900,445 A | 5/1999 | Chandler et al. | 523/161 |
| 5,942,027 A | 8/1999 | Ikai et al. | 106/31.33 |
| 5,980,624 A | 11/1999 | Ichikawa | 106/31.58 |
| 5,981,625 A * | 11/1999 | Zou et al. | 523/161 |
| 6,037,391 A * | 3/2000 | Iida | 523/161 |
| 6,040,356 A | 3/2000 | Kanki et al. | 523/160 |
| 6,048,914 A | 4/2000 | Goto et al. | 523/161 |
| 6,099,629 A | 8/2000 | Morita et al. | 106/31.6 |
| 6,142,452 A | 11/2000 | Denman et al. | 256/13.1 |
| 6,160,035 A | 12/2000 | Idogawa | 523/161 |
| 6,387,984 B1 * | 5/2002 | Ito | 523/161 |
| 6,391,943 B2 * | 5/2002 | Sarma et al. | 523/160 |
| 6,425,948 B1 * | 7/2002 | Nowak et al. | 106/31.15 |
| 6,454,846 B2 * | 9/2002 | Yatake | 106/31.58 |

FOREIGN PATENT DOCUMENTS

EP 1026209 8/2000

* cited by examiner

*Primary Examiner*—Callie Shosho
(74) *Attorney, Agent, or Firm*—Pennie & Edmonds LLP

(57) ABSTRACT

A non-erasable ink composition suitable for use in writing instruments is described comprising an isocyanate five thermoplastic polyurethane resin, a colorant and an organic solvent. The ink composition may also include a second resin, plasticizers, antioxidants, corrosion inhibitors, lubricants, chemical dispersants, and surfactants. The inks of the present invention exhibit a smooth writing performance and non-seepage.

37 Claims, No Drawings

POLYURETHANE BASED INKS FOR WRITING INSTRUMENTS

FIELD OF INVENTION

The present invention relates to ink compositions for writing instruments, methods of making such ink compositions and writing instruments making use of the ink composition. The non-erasable ink compositions comprise an isocyanate free thermoplastic polyurethane resin, organic solvent(s), and colorant(s). Inks in accordance with the present invention are useful in pens for handwriting

BACKGROUND OF INVENTION

Many attempts have been made to improve the performance of writing inks (reduce seepage, reduce skipping, modify viscosity for better flow and smoothness of writing) by incorporating additives, resins, solvents, waxes, etc. into the ink formulations. To our knowledge, no solvent-based non-erasable writing inks exist in the patent literature which use an isocyanate free thermoplastic polyurethane resin.

U.S. Pat. No. 5,942,027 to Ikai discloses a solvent based writing ink which contains a sub-micron dispersion of silica to achieve non-seepage. Ikai does not disclose the use of an isocyanate free thermoplastic polyurethane resin to achieve a well functioning writing ink. U.S. Pat. No. 5,868,511 to Osada discloses a solvent based ink with good writing characteristics and long cap off time which contains a resin dissolved in solvent with a colorant However, Osada's patent does not disclose the use of an isocyanate free thermoplastic polyurethane resin to achieve a functional writing ink. U.S. Pat. No. 4,525,216 to Nakanishi discloses a non-aqueous erasable ink which contains organic solvent, colorant, resin, an alkylamide, and a sorbitan fatty acid. Nakanishi does not disclose the use of an isocyanate free polyurethane resin to achieve good writing characteristics.

Solvent based writing ink formulations which contain dissolved resins and dissolved or dispersed colorants are known in the art. U.S. Pat. No. 5,980,624 to Ichikawa discloses a writing ink which contains a resin dissolved in a solvent with a colorant but does not disclose the use of an isocyanate free polyurethane resin. U.S. Pat. No. 6,048,914 to Goto discloses a writing ink which contains a resin dissolved in a solvent with a colorant but does not disclose the use of an isocyanate free polyurethane resin U.S. Pat. No. 6,160,035 to Idogawa discloses a writing ink which contains a resin dissolved in a solvent with a colorant but does not disclose the use of an isocyanate free polyurethane resin.

Inks comprising reactive polyurethanes are known in the printing ink art. U.S. Pat. No. 5,248,752 to Argyropoulos et al. discloses the use of polyurethane meth(acrylate) polymers which react either thermally or by actinic radiation for use in inks. U.S. Pat. No. 4,003,751 to Carder discloses an ink composition comprising at least cofunctional acrylate-urethane which will react either thermally or by actinic radiation. U.S. Pat. No. 3,728,298 to Hartmann discloses the use of a printing ink based upon a polyurethane resin which is applied in a relatively uncured state, and is permitted to cure in room temperature under the action of curing agents. U.S. Pat. No. 3,728,298 further discloses a pot life of approximately forty hours. None of these references disclose the use of an isocyanate free thermoplastic polyurethane resin in writing inks.

U.S. Pat. No. 4,812,492 to Eckes discloses the use of aqueous pigment dispersions containing a finely divided inorganic and/or organic pigment, an aqueous polyurethane dispersion, water and optionally organic solvent U.S. Pat. No. 4,812,492 does not disclose solvent soluble colorants or the non-aqueous thermoplastic polyurethane resin of the present invention.

U.S. Pat. No. 4,389,499 to Riesgraf discloses an erasable writing ink which contains a resin dissolved in a solvent with a colorant U.S. Pat. No. 4,390,646 to Ferguson discloses an erasable writing ink which contains a thermoplastic block copolymer resin dissolved in a solvent with a colorant U.S. Pat. No. 4,391,927 to Farmer discloses an erasable writing ink which contains a thermoplastic block copolymer resin dissolved in a solvent with a colorant. These references do not disclose the non-erasable ink compositions of the present invention.

U.S. Pat. No. 5,852,072 to Banning et al. discloses an erasable ink composition containing a water-insoluble polymeric dye obtained from the polymerization of at least two coreactive polyfunctional monomers with at least one of the monomers possessing a dye moiety covalently bonded thereto. The ink is intended for marking instrument, particularly ballpoint pens. U.S. Pat. No. 5,852,072 does not disclose the isocyanate free polyurethane resin or the non-erasale ink compositions of the present invention.

Like U.S. Pat. No. 5,852,072, U.S. Pat. No. 5,756,561 to Wang, U.S. Pat. No. 5,900,445 to Chandler and U.S. Pat. No. 5,852,073 to Villiger discloses inks for ballpoint pens using polyurethanes. These references do not disclose the isocyanate free polyurethane resin or the non-erasable ink compositions of the present invention U.S. Pat. No. 6,040,356 to Kanki discloses a gravure ink made using solvent, pigment and polyurethane resin. U.S. Pat. No. 6,040,356 does not disclose the solvent soluble colorants of the present invention nor is the present invention designed to be a printing ink.

This invention satisfies the need for a well performing writing ink for writing instruments which does not seep or leak from the delivery end of the pen.

SUMMARY OF INVENTION

The present invention discloses an ink for a writing instrument, wherein the ink exhibits better overall performance when compared in the same writing instruments to inks which do not contain the isocyanate free thermoplastic polyurethane resin. Preferably, the writing instrument is usable on ink-absorbing surfaces. Preferably, the writing instrument is a ballpoint pen.

In one embodiment of the invention, a non-erasable ink composition for a writing instrument comprises an isocyanate free thermoplastic polyurethane resin, an organic solvent and a colorant. Preferably, the resin is a solution grade polyurethane thermoplastic resin. More preferably, the polyurethane resin is Estane® 5700 series available from B.F. Goodrich. Preferably, the isocyanate free thermoplastic polyurethane resin is present in the ink composition from about 0.1 to about 75 weight percent of the ink. More preferably, the isocyanate free thermoplastic polyurethane resin is present in the ink composition from about 1.0 to about 35 weight percent of the ink.

Preferably, the weight average molecular weight of the resin is from about 1000 to about 100,000.

Preferably, the thermoplastic polyurethane resin and organic solvent form a homogeneous solution and the colorant is soluble in the homogeneous solution or dispersed in the solution.

The colorant may be used alone or in the form of a mixture of two or more colorants. Preferably, the colorant is present in the ink composition in amounts from about 0.1 to about 60 weight percent of the ink composition. The colorant can be a dye or a pigment. Preferably, the pigment is selected from the group consisting of organic pigments, inorganic pigments, metallic pigments, phosphorescent pigments, fluorescent pigments, photochromic pigments, thermochromic pigments, iridescent pigments, pearlescent pigments and liquid crystal pigments.

The viscosity of the ink compositions of the present invention is that usable for a writing instrument. Preferably the viscosity of the ink composition of the present invention is less than 500,000 cPs at 20° C. More preferably the viscosity of the ink composition of the present invention is from about 1000 to about 50,000 cPs at 20° C. Most preferably, the viscosity is from about 2000 to about 30,000 cPs at 20° C.

The organic solvent may be used alone or in the form of a mixture between two or more organic solvents. Examples of solvents include, but are not limited to, alcohols, polyols, polyol ethers, ketones, esters, pyrrolidones, lactones, hydrocarbons or mixtures thereof. Preferably, the organic solvent(s) is present in an amount from about 1 to about 90 weight percent of the ink composition. Most preferably, the organic solvent(s) is present in an amount from about 10 to about 65 weight percent of the ink composition.

In another embodiment of the invention, a non-erasable ink composition comprises an isocyanate free thermoplastic polyurethane resin, organic solvent, a solvent soluble non-aqueous colorant and a second resin. The second resin may be used alone or in the form of a mixture of two or more resins. Preferably, the second resin is present in an amount from about 0.1 to about 50 weight percent of the ink composition. More preferably, the second resin is present in an amount from about 0.1 to about 20 weight percent of the ink composition.

Preferably, the second resin is selected from the group consisting of polyesters, polystyrene, styrene copolymers, acrylonitrile butadiene copolymers, polyisobutylene, polyvinyl chloride, polyvinylidene chloride, polyvinyl acetals, polyvinyl butyrals, polyacrylonitrile, polyacrylates, polymethacrylates, polymethymethacrylates, polybutadiene, ethylene vinyl acetate, polyamides, polyimides, polysulfones, polyphenylene sulfide, polyvinyl esters, melamines, vinyl esters, epoxies, polycarbonates, polyether sulfones, polyacetals, phenolics, polyester carbonate, polyethers, polyethylene terephthalate, polytrimethylene terephthalate, polybutylene terephthalate, polyarylates, polyarylene sulfides, polyketones, polyethylene, high density polyethylene, polypropylene, rosin esters, hydrocarbon resins, copolymers, grafts, blends, and mixtures thereof.

In another embodiment of the invention, a non-erasable ink composition comprises an isocyanate free thermoplastic polyurethane resin, an organic solvent, a colorant and an antioxidant. Preferably, the antioxidant is present in an amount from about 0.05 to about 30 weight percent of the ink composition. More preferably, the antioxidant is present in an amount from about 0.1 to about 10 weight percent of the ink composition. Preferably, the antioxidant is selected from the group consisting of tocopherals, butylated hydroxy toluene, eugenol and hydroquinone. More preferably, the antioxidant is butylated hydroxy toluene.

In another embodiment of the invention, a non-erasable ink composition comprises an isocyanate free thermoplastic polyurethane resin, an organic solvent, a colorant and a plasticizer. The plasticizer may be used alone or in the form of a mixture of two or more plasticizers. Preferably, the plasticizer is acetyl-n-butyl citrate. Preferably, the plasticizer is present in an amount from about 0.1 to about 40 weight percent of the ink composition, more preferably, from about 1 to about 20 weight percent and most preferably, from about 2 to about 15 weight percent.

In another embodiment of the present invention, a non-erasable ink composition comprises an isocyanate free thermoplastic polyurethane resin, an organic solvent, a colorant and a corrosion inhibitor. The corrosion inhibitor may be used alone or in the form of a mixture of two or more corrosion inhibitors. Preferably, the corrosion inhibitor is present in an amount from about 0.01 to about 10.0 weight percent of the ink a composition. More preferably, the corrosion inhibitor is present in an amount from about 0.05 to about 2.0 weight percent of the ink composition. Preferably, the corrosion inhibitor is chosen from the class of corrosion inhibitors called triazole derivatives (such as Irgamet 30 and 39 from Ciba Geigy in Basel, Switzerland or Cobratec 99 or 911S from PMC in Cincinnati, Ohio) or from a class of corrosion inhibitors called dialkyl naphthalene sulfonate salts (such as NA-SUL BSN from King industries in Norwalk, Conn.).

Ink compositions of the present invention may further comprise surfactants, lubricants, chelating agents, chemical dispersing agents, solely or mixtures thereof. The lubricant may be used alone or in the form of a mixture of two or more lubricants. Preferably, the lubricant is selected from the group consisting of alcohol ester, amides, polyol esters, fatty acids, fatty alcohols, silicones, liquid polyolefins and fatty acid metal salts. Most preferably, the lubricant is sorbitan sesquioleate. Preferably, the lubricant is present in an amount from about 0.1 to about 30 weight percent of the ink composition. More preferably, the lubricant is present in an amount from about 1 to about 15 weight percent of the ink composition. The chemical dispersant may be used alone or in the form of a mixture of two or more chemical dispersants. Preferably, the chemical dispersant is an oleophilic chemical dispersant, an acid function co-polymer chemical dispersant or soya lecithin. The total amount of such additional components is typically from about 0.1 weight percent to about 30 weight percent and preferably, from about 0.1 weight percent to about 10 weight percent.

Many colors and blends are envisioned in the present invention. Inks of the present invention are well functioning writing inks and exhibit a smooth writing performance.

DESCRIPTION OF PREFERRED EMBODIMENTS

As used herein, the term "homogeneous solution" means free of particles of undissolved material (e.g, polymer).

As used herein, the term "thermoplastic polyurethane" is a thermoplastic polymer produced by the reaction of a polyisocyanate and a hydroxyl-containing material. A generic structure of a thermoplastic polyurethane is shown below:

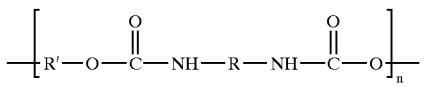

Where R and R' are alkyl groups and n is an integer.

As used herein, the term "isocyanate free polyurethane" is a polyurethane polymer which does not have any free isocyanate groups for further crossbranching and crosslinking.

As use herein, the term "well functioning writing ink" means an ink which writes easily without "gooping" or "blobbing" and doesn't seep from the pen point.

As used herein, the term "writing performance" is known by one skilled in art to mean, for example, a reduction in amount of skipping, gooping, blobbing, blotting, bleeding and globbing as the ink is dispensed from the writing instrument and on to paper. Pens exhibiting improved writing deliver a uniform layer of ink at usual writing speeds and produce a uniform script. Measurements of writing performance have been described, for example, in U.S. Pat. Nos. 6,099,629, 6,142,452 and 6,048,914.

As used herein, the term "antioxidant" is an additive for inks to prevent the discoloration and changes in the viscosity of the ink with the passage of time. Examples of antioxidants are dihydroxybenzene derivatives, hydroxybenzenes, such as butylated hydroxy toluene, and hydroquinone.

As used herein, the term "iridescent" refers to the result of the interference of light rays from the surface of a transparent, thin layer.

As used herein, the term "phosphorescent pigment" refers to pigments that glow in the dark. Specifically, phosphorescent pigments store energy during exposure to illumination, such as daylight or UV radiation, and release the radiation as visible light when the illumination is cut off As used herein, the term "fluorescent pigments" refers to pigments which upon exposure to light emit light energy of longer wavelengths in the visible spectrum a very short time after exposure to light. Light emitted from fluorescent pigments adds to the reflected light to give a brilliant color.

As used herein, the term "about," as used in connection with one or more numbers or numerical ranges, should be understood to refer to all such number including all numbers in a range.

Examples of thermoplastic polyurethane resins used in present invention are the ESTANE® series from the B.F. Goodrich Company, the PELLETHANE® series from Dow Chemical, ELASTOLLAN® from BASF, DESMOPAN® and TEXIN® from Bayer, and Q-THANE® from Morton Intentional. Preferably, the thermoplastic resin is a solution grade thermoplastic polyurethane resin. Preferably, the thermoplastic polyurethane resin is an Estane® thermoplastic polyurethane available from B.F. Goodrich.

The colorant may be used alone or in the form of a mixture of two or more solvent soluble non-aqueous colorants. The colorant can be either a dye or a pigment Preferably, the colorant is present in the ink composition in amounts from about 0.1 to about 60 weight percent of the ink composition.

Examples of dyes that may be used in the present invention include Giemsa (May-Greenwald's) stain or Sudan Black, commercially available from Fisher, Inc. or Eastman Kodak, Rochester N.Y.; Sudan I, and nigrosine commercially available from Aldrich Chemical; Sudan II commercially available from Aldrich Chemical; and other classes of dyes such as Yellow Dyes commercially available from Pylam, Inc. (Garden City, N.J.); Neozopan Red GE available from BASF Chemical Company, Oil Blue A dyes commercially available from E.I. DuPont; Methyl Violet 1 B commercially available from Aldrich Chemical; Sudan Red BB commercially available from BASF Chemical Company; Sudan Orange G; Oil Red O; para-phenylazophenol; Rose Bengal, and 4',5'-dibromofluoroscein, all commercially available from Aldrich Chemical; Sudan Red 7B; Sudan Black B; Sudan Yellow 146; Neozopan Blue; Oracet Yellow GN, available from Ciba-Geigy, BASF Sudan Yellow 150; BASF Sudan Red 7B; Oil Yellow; Bayer Ceres Red 3R; Orient Chemical Ind., Ltd.; Oil Pink 312; Pylam Pylakrome Pink LX 1900; Bayer Ceres Blue R; BASF Neozapan 807; BASF Sudan Deep Black; and Bayer Ceres Black BN.

Preferably, the dyes used are Solvent Black 46, Solvent Blue 36. Solvent Blue 51, Solvent Blue 37, Solvent Red 39, Solvent Red 33, and Solvent Yellow 47.

Preferably, the pigment is selected from the group consisting of organic pigments, inorganic pigments, metallic pigments, phosphorescent pigments, fluorescent pigments, photochromic pigments, thermochromic pigments, iridescent pigments, pearlescent pigments and liquid crystal pigments. The amount of pigment depends upon the desired color. Pastel colors are achieved with the addition of titanium dioxide white or a similar white pigment to a colored pigment.

Organic pigments suitable for the present invention include, but are not limited to, (1) azo pigments, such as para reds, pigment red 6, toluidine reds, naphthol reds, a naphthol maroon precipitated azo, pyrazolone reds, dinitroaniline orange, pyrazolone orange, hansa yellows and diarylide (supplied by BASF in Charlotte, N.C., Ciba Specialty Pigments in Newport, Del. and Sun Chemical Company in Cincinnati, Ohio); (2) precipitated azo or metallized azo pigments, such as lithol reds, lithol rubine B (BON pigment), permanent red 2B (BON pigment), lithol red 2G (BON pigment), yellow BON maroon, Lake Bordeaux and nickel azo yellow (supplied by BASF in Charlotte, N.C., Ciba Specialty Pigments in Newport, Del. and Sun Chemical Company in Cincinnati, Ohio); (3) condensation azo pigments, such as Cromophtal (Ciba-Geigy); (4) basic dye pigments, such as ketonimes, thiazines, xanthenes and triarylmethanes; (5) phthalocyanine pigments (supplied by BASF in Charlotte, N.C., Ciba Specialty Pigments in Newport, DE and Sun Chemical Company in Cincinnati, Ohio); (6) quinacridone pigments, such as 2,9dimethyl quinacridone, quinacridonequinone, and 4,11-dichloroquinacridone (supplied by Ciba Specialty Pigments in Newport, Del. and Sun Chemical Company in Cincinnati, Ohio); (7) thio-indigo pigments, such as 4,4'-dichloro-7,7'-dimethylthioindigo, 4,4',7,7'-tetra chlorothioindigo, 5,5'-chloro-7,7'-dimethylthioindigo (supplied by BASF in Charlotte, N.C., Ciba Specialty Pigments in Newport, Del. and Sun Chemical Company in Cincinnati Ohio); (8) perinones or diimides of naphthalene, such as perinone orange (supplied by BASF in Charlotte, N.C., Ciba Specialty Pigments in Newport, Del. and Sun Chemical Company in Cincinnati, Ohio); (9) perylenes, such as perylene maroon and perylene bordeaux and (10) anthraquinones, such as indanthrone blue, isodibenzanthrone violet and anthra pyrimidine yellow (supplied by BASF in Charlotte, N.C., Ciba Specialty Pigments in Newport, Del. and Sun Chemical Company in Cincinnati, Ohio).

Inorganic pigments suitable for the present invention include, but are not limited to, (1) iron oxide pigments (made by Bayer Corporation in Pittsburgh, Pa. and Cleveland Pigment and Color in Cleveland, Ohio) such as Persion Gulf red oxide, Spanish oxide siennas, burnt siennas, ochers, Turkey umber, burnt umber, calcination of limonite and siderite and magnetite; (2) chromium oxide pigments (made by Ceramic Color and Chemical Mfg. Corp. in New Brighton, Pa. and Ferro Corp in Cleveland, Ohio); (3) chromate pigments (made by Cleveland Pigment and Color in Cleveland, Ohio and Johnson Matthey in Dowington, Pa.), such as primrose chrome yellow, light (lemon) chrome yellow, medium yellow, chrome orange (light and dark) and molybdate orange; (4) titanium dioxide (made by Kemira Pigments in Savannah, Ga. and Ishihara Corp. USA in San Francisco, Calif.) and mixed-phase titanium dioxide pigments (made by Ceramic Color and Chemical Mfg. Corp. in New Brighton, Pa. and Ferro Corp in Cleveland, Ohio), i.e. mixtures obtained by incorporating foreign ions into a lattice of titanium dioxide; (5) cadmium pigments, obtained, for example, by co-precipitating barium sulphate with concentrated pigments; (6) ultramarine pigments (made by Ferro Corporation in Cleveland, Ohio and Cleveland Pigment and Color in Cleveland. Ohio), which are sodium aluminum sulfo-silicates having the general formula, $Na_8Al_6Si_6O_{24}S_{(2-4)}$ and (7) iron blue pigments (made by Johnson Matthey in Dowington, Pa. and Degussa-Huls in Belpre, Ohio), which consist of alkaline iron salts of iron-cyanogen hydrogen acid which contains divalent as well as trivalent iron, such as Milori Chinese, Prussian and toning blues.

Metallic pigments are typically prepared from metallic elements and their alloys, e.g., aluminum, copper, bronze and zinc. Metallic pigments suitable for the present invention include, but are not limited to, (1) aluminum flake pigments, leafing or nonleafing, (made by Silberline in Tamaqua, Pa., and MD-Both Industries in West Chicago, Ill.); (2) bronze pigments (made by U.S. Bronze Powders In Flemington, N.J.) and (3) zinc dust (made by Meadowbrook Company, New York, N.Y. and R.E. Carroll, Inc. in Trenton, N.J.). Leafing aluminum flakes are typically produced by using stearic acid as the milling lubricant in the manufacture of the leafing aluminum flake pigments. For non-leafing aluminum flakes, a long-chain, unsaturated fatty acid, such as oleic acid, is used. The leafing and non-leafing properties of the aluminum flake pigments have been shown to be due to the differences in the interracial tension between the vehicle and the monomolecular layer of fatty acid, coated on the aluminum flake. Preferably, the thickness of the aluminum flake pigments ranges in size from about 0.1 to about 2 micron. Preferably, the diameter of the aluminum flake pigments ranges in size from about from about 0.1 to 20 micron.

Carbon black pigments (made by Cabot Corporation in Billerica, Mass., and Degussa-Huls in Belpre, Ohio) are composed of nearly pure carbon of colloidal dimensions Different grades of carbon blacks vary with respect to average particle sizes. Particle size of the carbon black ranges from about 1 nm to about 500 nm. For example, high-color channel carbon black has a particle diameter range of 100–140 Å, medium-color channel carbon black has a particle diameter range of 160–270 Å, medium-color furnace carbon black has a particle diameter range of 170–270 Å, two-color furnace carbon black has a particle diameter range of 290–700 Å and thermal black has a particle diameter range of 2250–3000 Å. The carbon black may be manufactured using a furnace process, impingement (channel or roller), thermal, lampblack and acetylene thermal cracking. Carbon black pigments suitable for the present invention include, but are not limited to, high-color channel carbon black, medium-color channel carbon black, medium-color furnace carbon black, two-color furnace carbon black, thermal blacks, graphite, bone blacks, vegetable blacks, and mineral blacks.

Pearlescent pigments suitable for the present invention include, but are not limited to, Iriodin® (EM Industries, Hawthorne, N.Y.) Silverwhite pigments (100 series) which consist of mica surrounded by a relatively thin titanium dioxide layer, Iriodin® Interference pigments (200 series); Iriodin® gold lustre pigments (300 series) which consist of a mica nucleus covered with a layer of titanium dioxide and an iron oxide layer, Iriodin® metallic lustre pigments (500 series) which consist of a mica nucleus covered with an iron oxide layer and Iriodin® 1 WR pigments (9000 series).

Phosphorescent pigments are largely composed of zinc sulphide and zinc-cadmium sulphide. Phosphorescent pigments are slightly coarser than metallic pigments and are either colorless or have pastel shades. Phosphorescent pigments suitable for the present invention include, but are not limited to LUMILUX® N-pigments which emit yellow-green light, LUMILUX® pigments which emit a bluish light, LUMILUX® R pigments, LUMILUX® B pigments, LUMILUX® Q pigments, LUMILUX® CD pigments and LUMILUX® R Effect-pigments. LUMILUX® pigments arm available from Riedel-de Haën (Seekze, GE.).

Examples of fluorescent pigments include but are not limited to the commercially available pigments from Radiant Color (of San Francisco, Calif.) tradenamed VISIPRINT; from Sun Chemical Company (of Cincinnati Ohio) tradenamed SUNBRITE; from Day Glo, Inc. (of Cleveland, Ohio) tradenamed STARFIRE; from Swada, Ltd. (of London, England) tradenamed OLX.

Examples of photochromic pigments suitable for the present invention include, but are not limited to, spirooxazine-type compounds, spiropyran-type compounds and pyran-type compound Examples of spirooxazine-type compounds include 1,3,3-trimethylspiro[indoline-2,3-(3H) naphtho(2,1-b)(1,4-oxazine], 5-chloro 1,3,3-trimethylspiro [indoline-2,3'-(3H)naphtho(2,1-b)(1,4)-oxazine] and 1,3,3, 5-tetramethylspiro[indoline-2,3'-(3H)naphtho(2,1-b)(1,4)-oxazine]; 1,3,3-trimethyl-9'-methoxyspiro[indoline-2,3'-(3H)naphtho(2,1-b)(1,4)-oxazine]1,3,3,5-tetramethyl-9'-methoxyspiro[indoline-2,3'-(3H)naphtho(2,1-b)(1,4)-oxazine] and 1,3,3,5,6-pentamethyl-9'-methoxyspiro [indoline-2,3'-(3H)naphtho(2,1-b)(1,4)oxazine]; 4-trifluoromethyl-1,3,3-trimethyl-5'-methoxyspiro [indoline-2,3'-(3H)naphtho(2,1-b) (1,4)-oxazine], 6'-trifluoromethyl-1,3,3,-trimethyl-5'-methoxyspiro [indoline-2,3'-(3H) naphtho(2,1-b)(1,4)-oxazine] and 4-trifluoromethyl-1,3,3-trimethyl-9'-methoxyspiro [indoline-2,3'-(3H)naphtho(2,1-b) (1,4)oxazine]; 1,3,5,6-tetramethyl-3-ethylspiro (indoline-2,3'-(3H)pyrido(3,2-f)(1, 4)benzoxazine], 1,3,3,5,6-pentamethylspiro [indoline-2,3'-(3H)pyrido(3,2-f)(1,4)benzooxazine] and 1-methyl-3,3-disphenylspiro[indoline-2,3'-(3H)pyrido(3,2-f)(1,4-benzooxazine]; 1-benzyl-3,3-dimethylspiro[indoline-2,3'-(3H)naphtho(2,1-b)(1,4-oxazine], 1-(4-methoxybenzyl)3,3-dimethylspiro[indoline-2,3'-(3H)naphtho (2,1-b)(1,4-oxazine],1-(3,5dimethylbenzyl)-3,3-dimethylspiro [indolin-2,3'-(3H)naphtho(2,1-b)(1,4)-oxazine], 1-(4-chlorobenzyl)-3,3-dimethylspiro[indoline-2,3'-(3H)naphtho(2,1-b)(1,4-oxazine] and 1-(2-fluorobenzyl)-3,3-dimethylspiro [indoline-2,3'-(3H)naphtho(2,1-b)(1,4)-oxazine; 6'-piperidine-1,3,3-trimethylspiro[indole-2,3'-(3H)naphtho (2,1)(1,4)-oxazine], 6'-indoline-1,3,3-trimethylspiro [indoline2,3'-(3H)naphtho(2,1-b)(1,4oxazine]. Examples of spiropyran-type compounds are -(2,3,5-pentamethylbenzyl)-3,3-dimethylspiro [indoline-2,3'-(3H) naphtho(2,1-b)-pyran] and 1-(2methoxy-5-nitrobenzyl)-3,3-dimethylspiro[indoline-2,3'-(3H)naphtho(2,1-b)pyran]. Examples of pyran-type compounds include 2,2-di-p-methoxyphenylnaphtho (2,1-b)pyran, 2,2-di-p-methoxyphenylphenanthra (2,1-b)pyran, 2,2-diphenylnaphtho (2,1-b)pyran and 2,2-diphenylphenanthra (2,1-b)pyran.

Examples of thermochromic pigments suitable for the present invention include, but are not limited to, those disclosed in U.S. Pat. No. 4,957,949 to Kamada et al.

Examples of liquid crystal pigments suitable for the present invention include, but are not limited to, liquid crystal pigments from the Helicone HC® series made by Wacker Silicones Corporation in Michigan.

The organic solvent may be used alone or in the form of a mixture between two or more organic solvents. Examples of solvents include, but are not limited to, alcohols, polyols, polyol ethers, ketones, pyrrolidones, lactones, hydrocarbons or mixtures thereof. Preferably, the polyol ether is ethylene glycol phenyl ether, available from Dow Chemical (located in Midland, Mich.). Preferably, the pyrrolidone is N-methyl-2-pyrrolidone from ISP (located in Parsippany, N.J.).

Preferably, the organic solvent is present in an amount from about 1 to about 90 weight percent of the ink composition. Most preferably, the organic solvent is present in an amount from about 20 to about 65 weight percent of the ink composition.

Resins may be used alone or in the form of a mixture to two or more resins. Resins suitable for use as the second resin in the present invention include, but are not limited to, thermoplastic, addition and condensation polymers. Illustrative examples include, but are not limited to, polyesters, polystyrene, styrene copolymers, acrylonitrile butadiene copolymers, polyisobutylene, polyvinyl chloride, polyvinylidene chloride, polyvinyl acetals, polyvinyl butyrals, polyacrylonitrile, polyacrylates, polymethacrylates, polymethylmethacrylates, polybutadiene, ethylene vinyl acetate, polyamides, polyimides, polysulfones, polyphenylene sulfide, polyvinyl esters, melamines, vinyl esters, epoxies, polycarbonates, polyether sulfones, polyacetals, phenolics, polyester carbonate, polyethers, polyethylene terephthalate, polytrimethylene terephthalate, polybutylene terephthalate, polyarylates, polyarylene sulfides, polyethylene high density polyethylene polypropylene, rosin esters, hydrocarbon resins, copolymers, grafts, blends or mixtures thereof. The copolymers and blends of these polymers are well known to those skilled in the art, as are polymers which may serve as a backbone or a grafted polymer in graft polymers.

Antioxidants may be used alone or in the form of a mixture to two or more antioxidant. Examples of antioxidants include, but are not limited to, are (1) hindered phenols [such as Alvinox 100 made by 3V Inc. in Charlotte, N.C. or BNX 1000 made by Mayzo Inc in Norcross, Ga.) or BHT (butylated hydroxy toluene) made by Eastman Chemical Co. or Vanox SKT made by Vanderbilt Chemical Co in Connecticut], (2) alkylidene bis, tris, and polyphenols [such as the Cyanox series (425, 1790, 2246) made by CYTEC in Perrysburg, Ohio], (3) thio bis, tris and polyalkylated phenols [such as Irganox 1035 made by Ciba Geigy in Basel, Switzerland], (4) amines [such as PTZ phenothiazine made by Zeneca Specialties in England or the Naugard series (A, J, Q, SA, 445) made by Uniroyal Chemical Co in Connecticut], (5) esters [such as the Argus series (DLTDP, DSTDP, DMTDP, DTDTDP) from Witco Polymer Additives in Greenwich, Conn.], (6) organic phosphites and phosphates [such the Albrite series (BTD HP, DBHP, DLHP) made by Albright & Wilson located in Richmond, Va.], (7) propyl gallate made by Eastman Chemical Co in Tennessee, (8) hydroquinone made by Monsanto Chemical Co in St. Louis, Mo., (9) tocopherol, such as vitamin E, (10) L-ascorbic acid and (11) eugenol (oil of cloves) or ionol. Preferred antioxidants are Vitamin E sold by A.D.M. (Decatur, Ill.), BHT sold by Eastman Chemical (Kingsport, Tenn.) and eugonol sold by Aldrich Chemical Co. (Milwaukee, Wis.). Most preferred is butylated hydroxy toluene. Preferably, the antioxidant is present in the ink composition in amounts from about 0.1 to about 30 weight percent, most preferably from about 0.1 to about 10 weight percent.

Corrosion inhibitors may be used alone or in the form of a mixture to two or more metal deactivators. Examples of corrosion inhibitors include, but arc not limited to triazole derivatives (such as Ingarmet 30 and 39 from Ciba Geigy in Basel, Switzerland or Cobratec 99 or 911S form PMC in Cincinnati, Ohio) or from a class of corrosion inhibitors called dialkyl naphthalene sulfonate salts (such as NA-SUL BSN from King Industries in Norwalk Conn.)., N,N'-phenyloxamide, N-salicylal-N'-salicyloylhydrazine, N,N'-bis-(salicyloyl-hydrazine, N,N'-bis(3,5-di-tert-butyl-4-hydroxyphenylpropionyl)-hydrazine, 3-salicyloylamino-1,2,4-triazole, bis-(benzylidene)-oxalic acid dihydrazide, tradenames Citrosol 50W, 50T, 50E made by Pfizer Chemical Co in New Haven, Conn.; Cheelox HE-24, NTA-14 nude by GAF Corporation in New Jersey and Chel DM-41, DPTA, Irganox 1024 made by Ciba Geigy in Basel, Switzerland).

Dispersing agents may be used alone or in the form of a mixture of two or more dispersing agents. Dispersing agents may be either anionic, nonionic or anphoteric. The anionic dispersant usable includes, for instance, sulfonated fatty acid ester such as dioctyl sodium sulfosuccinate, higher alcohol sulfate, polyoxyethylene alkyl phenyl ether sulfate, alkyl aryl sulfonate or olefin sulfonate. The nonionic dispersant usable in the present invention includes, for instance, polyoxyethylene ether compound such as polyoxyethylene alkyl ether or polyoxyethylene alkyl phenyl ether, polyhydric alcohol fatty acid ester or polyhydric alcohol fatty acid ester polyoxyethylene ether. The ink composition may contain a dispersing agent in an amount of not more than about 10 weight percent, preferably in the range of about 0.1 weight percent to about 5 weight percent, based on the ink composition Plasticizers may be used alone or in the form of a mixture to two or more plasticizers. Examples of plasticizers for use in this invention include, but are not limited to, derivatives of abietic, acetic acid, adipic acid, azelaic acid, benzaic acid, butiene, polyphenol citric acid, epoxy, fumaric acid, glutaric acid, gycerine, glycol, linear dibasic acid, petroleum, isobutyric, isophthalte, lactam, maleic acid, myristic acid, nitrile, oleic acid, palmitic acid, paraffin, pelargoiic acid, pentaerythritol, phenoxy, phosphoric acid, polyester, ricinoleic acid, sebacic acid, stearic acid, styrene, sucrose, sulfonic acid, tall oil, and trimellitate acid. Preferably, the plasticizer is Citroflex 4-A (acetyl-n-butyl citrate) sold by Morflex in Greesboro, N.C. Preferably, the plasticizer is present in the ink composition in amounts from about 0.1 to about 40 weight percent, more preferably from about 1 to about 20 weight percent, most preferably from about 2 to about 15 weight percent.

Additional components which can be added to the ink compositions of the present invention include fillers, U.V. stabilizers, surfactants, optical brighteners, and heat stabilizers. The total amount of such additional components is typically from about 0.1 weight percent to about 30 weight percent and preferably, from about 1 weight percent to about 15 weight percent.

EXAMPLES

The ink compositions of the present invention are best described by using the following examples; however, the invention is not limited thereto. All components are listed as parts by weight (pbw) unless otherwise noted.

Inks of the Present Invention

As shown below, the following formulations are examples of inks according to the present invention.

Example 1

| Black Ink Made Using Estane 5727 | |
|---|---|
| Black Dye* | 22.00 |
| Dowanol EPh** | 31.00 |
| M Pyrol*** | 32.00 |
| Lonzest SOC**** | 1.20 |
| Estane 5727***** | 13.80 |
| Total | 100.00 |

*The black dye is Solvent Black 46 available from many suppliers.
**Dowanol EPh is ethylene glycol phenyl ether available from Dow Chemical Company in Midland, MI.
***M Pyrol is N-methyl-2-pyrrolidone available from ISP in Parsippany, NJ
****Lonzest SOC is sorbitan sesquioleate available from LONZA in Fair Lawn, NJ
*****Estane 5727 is a polyurethane resin available BF Goodrich in Cleveland, OH

Example 2

| Black Ink Made Using Estane 5715 With Antioxidant | |
|---|---|
| Black Dye* | 23.15 |
| Dowanol EPh | 31.25 |
| M Pyrol | 30.50 |
| Lonzest SOC | 1.30 |
| Estane 5715** | 13.80 |
| BHT*** | 0.20 |
| Total | 100.00 |

*The black dye is Solvent Black 46 available from many suppliers.
**Estane 5715 is a polyurethane resin available from BF Goodrich in Cleveland, OH
***BHT is butylated hydroxy toluene available from Aldrich Chemical Company

Example 3

| Black Inks Made Using Estane 5715 With Plasticizer | | |
|---|---|---|
| | A | B |
| Black Dye | 22.80 | 22.70 |
| Dowanol EPh | 28.30 | 28.20 |
| M Pyrol | 29.00 | 29.00 |
| Lonzest SOC | 1.30 | 1.30 |
| Estane 5715 | 13.60 | 13.80 |
| Citroflex A-4* | 5.00 | 5.00 |
| Total | 100.00 | 100.00 |

*Citroflex A-4 is Acetyl-n-butyl citrate available from Morflex in Greensboro, NC

Example 4

| Blue Ink Made Using Estane 5715 | |
|---|---|
| Blue Dye* | 11.50 |
| Blue Dye** | 8.60 |
| Blue Dye*** | 7.70 |
| M Pyrol | 47.00 |
| DPG**** | 10.60 |
| Lonzest SOC | 1.00 |
| Estane 5715 | 13.60 |
| Total | 100.00 |

*The blue dye is Solvent Blue 36 available from many suppliers.
**The blue dye is Solvent Blue 51 available from many suppliers.
***The blue dye is Solvent Blue 37 available from many suppliers.
****DPG is dipropylene glycol available from Dow Chemical in Midland, MI

Example 5

| Black Ink Made Using Estane 5706 | |
|---|---|
| Black Dye | 21.42 |
| Dowanol EPh* | 32.38 |
| M Pyrol | 31.60 |
| Lonzest SOC | 1.20 |
| Estane 5706 | 13.40 |
| Total | 100.00 |

*Dowanol EPh is ethylene glycol phenyl ether available from Dow Chemical Company
**Estane 5706 is a polyurethane resin available from BF Goodrich in Cleveland, OH

Example 6

| Black Ink Made Using Estane 5799 | |
|---|---|
| Black Dye | 22.30 |
| Dowanol EPh | 31.10 |
| M Pyrol | 28.90 |
| Lonzest SOC | 1.30 |
| Estane 5799* | 16.40 |
| Total | 100.00 |

*Estane 5799 is a polyurethane resin available from BF Goodrich in Cleveland, OH All patents cited in the foregoing text are expressly incorporated herein by reference in their entirety.

It will be understood that the claims are intended to cover all changes and modifications of the preferred embodiments of the invention, herein chosen for the purpose of illustration, which do not constitute a departure from the spirit and scope of the invention.

We claim:

1. A non-erasable ink composition for a writing instrument comprising an isocyanate free thermoplastic polyurethane resin, an organic solvent and a colorant, wherein the viscosity of the ink composition is from about 1,000 to about 50,000 cps at 20° C., and the thermoplastic polyurethane resin and organic solvent from a homogeneous solution.

2. The ink composition of claim 1, wherein the colorant is soluble in said homogeneous solution or dispersed in said solution.

3. The ink composition of claim 1, wherein the thermoplastic resin is a solution grade isocyanate free thermoplastic polyurethane resin.

4. The ink composition of claim 1, wherein the isocyanate free thermoplastic polyurethane resin has a weight average molecular weight from about 1,000 to about 1,000,000.

5. The ink composition of claim 1, wherein the isocyanate free thermoplastic polyurethane resin is present in the ink composition from about 0.1 to about 75 weight percent of the ink.

6. The ink composition of claim 5, wherein the isocyanate free thermoplastic polyurethane resin is present in the ink composition from about 1.0 to about 35 weight percent of the ink.

7. The ink composition of claim 1, wherein the colorant is present in the ink composition in an amount from about 0.1 to about 60 weight percent of the ink composition.

8. The ink composition of claim 1, wherein the colorant is a dye.

9. The ink composition of claim 1, wherein the colorant is a pigment.

10. The ink composition of claim 9, wherein the pigment is selected from the group consisting of organic pigments, inorganic pigments, metallic pigments, phosphorescent pigments, fluorescent pigments, photochromic pigments, thermochromic pigments, iridescent pigments, pearlescent pigments and liquid crystal pigments.

11. The ink composition of claim 1, wherein the organic solvent is selected from the group consisting of alcohols, polyols, polyol ethers, ketones, esters, pyrrolidones, lactones, hydrocarbons and mixtures thereof.

12. The ink composition of claim 1, wherein the organic solvent is from about 1 to about 90 weight percent of the ink composition.

13. The ink composition of claim 12, wherein the organic solvent is from about 10 to about 65 weight percent of the ink composition.

14. The ink composition of claim 1, wherein the viscosity of the ink is from about 2000 to about 30,000 cps at 20° C.

15. The writing instrument of claim 1, wherein the writing instrument is usable on ink-absorbing surfaces.

16. The writing instrument of claim 1, wherein the writing instrument is a ballpoint pen.

17. A non-erasable ink composition for a writing instrument comprising an isocyanate free thermoplastic polyurethane resin, an organic solvent, a colorant and a second resin, wherein the viscosity of the ink composition is from about 1,000 to about 50,000 cps at 20° C. and the thermoplastic polyurethane resin and organic solvent form a homogeneous solution.

18. The ink composition of claim 17, wherein the second resin is present in an amount from about 0.1 to about 50 weight percent of the ink composition.

19. The ink composition of claim 18, wherein the second resin is present in an amount from about 0.1 to about 20 weight percent of the ink composition.

20. The ink composition of claim 17, wherein the second resin is selected from the group consisting of polyesters, polystyrene, styrene copolymers, acrylonitrile butadiene copolymers, polyisobutylene, polyvinyl chloride, polyvinylidene chloride, polyvinyl acetals, polyvinyl butyrals, polyacrylonitrile, polyacrylates, polymethacrylates, polymethylmethacrylates, polybutadiene, ethylene vinyl acetate, polyamides, polyimides, polysulfones, polyphenylene sulfide, polyvinyl esters, melamines, vinyl esters, epoxies, polycarbonates, polyether sulfones, polyacetals, polyvinyl butyrals, phenolics, polyester carbonate, polyethers, polyethylene terephthalate, polytrimethylene terephthalate, polybutylene terephthalate, polyarylates, polyarylene sulfides, polyketones, polyethylene, high density polyethylene, polypropylene, rosin esters hydrocarbon resins, copolymers, grafts blends and mixtures thereof.

21. A non-erasable ink composition for a writing instrument comprising an isocyanate free thermoplastic polyurethane resin, an organic solvent, a colorant and a corrosion inhibitor, wherein the viscosity of the ink composition is from about 1,000 to about 50,000 cps at 20° C., and the thermoplastic polyurethane resin and organic solvent from a homogenous solution.

22. The ink composition of claim 21, wherein the corrosion inhibitor is present in amount from about 0.01 to about to about 10 weight percent of the ink composition.

23. The ink composition of claim 22, wherein the corrosion inhibitor is present in amounts from about 0.05 to about to about 2 weight percent of the ink composition.

24. The ink composition of claim 21, wherein the corrosion inhibitor is selected from the group consisting of triazole derivatives and dialkyl naphthalene sulfonate salts.

25. A non-erasable ink composition for a writing instrument comprising an isocyanate free thermoplastic polyurethane resin, an organic solvent, a colorant and a chemical dispersant, wherein the viscosity of the ink composition is from about 1,000 to about 50,000 cps at 20° C. and the thermoplastic polyurethane resin and organic solvent form a homogeneous solution.

26. The ink composition of claim 25, wherein the chemical dispersant is an oleophilic chemical dispersant, an acid function co-polymer chemical dispersant or soya lecithin.

27. A non-erasable ink composition for a writing instrument comprising an isocyanate free thermoplastic polyurethane resin, an organic solvent, a colorant and an antioxidant, wherein the viscosity of the ink composition is from about 1,000 to about 50,000 cps at 20° C., and the thermoplastic polyurethane resin and organic solvent from a homogeneous solution.

28. The ink composition of claim 27, wherein the antioxidant is selected from the group consisting of tocopherals, butylated hydroxy toluene, eugenol and hydroquinone.

29. The ink composition of claim 27, wherein the antioxidant is present in an amount from about 0.05 to about 30 weight percent of the ink composition.

30. A non-erasable ink composition for a writing instrument comprising an isocyanate free thermoplastic polyurethane resin, an organic solvent, a colorant and a plasticizer, wherein the viscosity of the ink composition is from about 1,000 to about 50,000 cps at 20° C., and the thermoplastic polyurethane resin and organic solvent form a homogeneous solution.

31. The ink composition of claim 30, wherein the plasticizer is present in amounts from about 0.1 to about to about 40 weight percent of the ink composition.

32. The ink composition of claim 31, wherein the plasticizer is present in amounts from about 1 to about 20 weight percent of the ink composition.

33. The ink composition of claim 32, wherein the plasticizer is present in amounts from about 2 to about 15 weight percent.

34. A non-erasable ink composition for a writing instrument comprising an isocyanate free thermoplastic polyurethane resin, an organic solvent, a colorant and a lubricant, wherein the viscosity of the ink composition is from about 1,000 to about 50,000 cps at 20° C. and the thermoplastic polyurethane resin and organic solvent from a homogeneous solution.

35. The ink composition of claim 34, wherein the lubricant is sorbitan sesquioleate.

36. The ink composition of claim 34, wherein the lubricant is present in an amount from about 0.1 to about 30 weight percent of the ink composition.

37. The ink composition of claim 36, wherein the lubricant is present in an amount from about 1 to about 15 weight percent of the ink composition.

* * * * *

UNITED STATES PATENT AND TRADEMARK OFFICE
CERTIFICATE OF CORRECTION

PATENT NO. : 6,797,748 B2
DATED : September 28, 2004
INVENTOR(S) : Chen et al.

It is certified that error appears in the above-identified patent and that said Letters Patent is hereby corrected as shown below:

Column 12,
Line 61, "from" should be -- form --.

Column 13,
Line 64, "esters" should be -- esters, --.
Line 65, "grafts blends" should be -- grafts, blends, --.

Column 14,
Lines 4, 29 and 56, "from" should be -- form --.
Line 5, "homogenous" should be -- homogeneous --.

Signed and Sealed this

Twenty-second Day of March, 2005

JON W. DUDAS
*Director of the United States Patent and Trademark Office*